United States Patent
Brouwer (10) Patent No.: US 6,799,045 B1
(45) Date of Patent: Sep. 28, 2004

(54) RELIABLE CONGESTION CONTROL IN A CDMA-BASED MOBILE RADIO COMMMUNICATIONS SYSTEM

(75) Inventor: Frank Brouwer, Ga Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 603 days.

(21) Appl. No.: 09/707,159

(22) Filed: Nov. 7, 2000

(51) Int. Cl.[7] .......................... H04Q 7/20; H04B 1/38; H04B 7/00
(52) U.S. Cl. ................. 455/453; 455/422.1; 455/423; 455/424; 455/434; 455/436; 455/442; 455/522; 455/63.1; 455/67.11; 455/561; 370/310
(58) Field of Search ............................. 455/436, 442, 455/501, 552, 63.1, 67.11, 69, 561, 127.1, 13.4, 422.1, 423, 424, 434, 453; 370/310, 318

(56) References Cited

U.S. PATENT DOCUMENTS

| | | | |
|---|---|---|---|
| 5,758,090 A | * | 5/1998 | Doner .......................... 709/236 |
| 5,839,056 A | | 11/1998 | Hakkinen |
| 5,859,838 A | | 1/1999 | Soliman |
| 5,924,043 A | * | 7/1999 | Takano ......................... 455/522 |
| 5,946,346 A | | 8/1999 | Ahmed et al. |
| 5,960,353 A | | 9/1999 | Lee |
| 6,192,249 B1 | * | 2/2001 | Padovani ..................... 455/453 |
| 6,226,526 B1 | | 5/2001 | Sakoda et al. |
| 6,259,927 B1 | | 7/2001 | Butovitsch et al. |
| 6,269,239 B1 | | 7/2001 | Hashem et al. |
| 6,275,711 B1 | * | 8/2001 | Yamada et al. ............... 455/522 |
| 6,285,664 B1 | * | 9/2001 | Bernstein et al. ............ 370/318 |
| 6,330,456 B1 | * | 12/2001 | Hashem et al. ............... 455/522 |
| 6,334,058 B1 | * | 12/2001 | Nystrom et al. ............... 455/453 |
| 6,343,218 B1 | * | 1/2002 | Kaneda et al. ............... 455/522 |
| 6,389,265 B1 | | 5/2002 | Jeschke et al. |
| 6,418,137 B1 | | 7/2002 | Bontu et al. |
| 6,434,380 B1 | * | 8/2002 | Andersson et al. .......... 455/406 |
| 6,463,295 B1 | * | 10/2002 | Yun ............................. 455/522 |
| 6,477,380 B1 | * | 11/2002 | Uehara et al. ............... 455/456.1 |
| 6,477,388 B1 | * | 11/2002 | Schmutz ...................... 455/522 |
| 6,493,564 B2 | * | 12/2002 | Longoni et al. ............. 455/522 |
| 6,512,925 B1 | | 1/2003 | Chen et al. |
| 6,603,773 B2 | * | 8/2003 | Laakso et al. ............... 370/441 |
| 2002/0055367 A1 | | 5/2002 | Hamabe et al. |
| 2002/0082037 A1 | * | 6/2002 | Salonaho et al. ........... 455/522 |

FOREIGN PATENT DOCUMENTS

| | | | |
|---|---|---|---|
| WO | WO 9849785 A1 | * 11/1998 | ........... H04B/7/005 |
| WO | 99/16185 | 4/1999 | |
| WO | 00/33475 | 6/2000 | |
| WO | 00/38348 | 6/2000 | |
| WO | WO 00/59131 | 10/2000 | |

OTHER PUBLICATIONS

Walid Hamdy, A Variance Based Reverse Link Overload Detection Mechanism, Sep. 17, 1998, Qualcomm Proprietary. U.S. patent application Ser. No. 09/736,574, Spaling et al. filed Dec. 15, 2000.

* cited by examiner

*Primary Examiner*—Vivian Chin
*Assistant Examiner*—Raymond B. Persino
(74) *Attorney, Agent, or Firm*—Nixon & Vanderhye P.C.

(57) ABSTRACT

The present invention provides an inexpensive and effective way to provide reliable cell congestion control. Transmit power control commands issued in the cell are detected, and the reliability of the issued transmit power commands is determined. A condition in the cell, e.g., congestion level, is controlled based on those issued transmit power commands which are determined to be reliable. Reliably issued transmit power control commands include those that are consistent with a corresponding transmit power control decision made by a receiver of the command, assuming the decision is not influenced by a maximum or minimum transmit power level. Those commands that are inconsistent with that decision are deemed unreliable, and therefore, are not considered in controlling the condition of the cell. In a preferred example implementation of the present invention, only reliably issued transmit power control commands are counted, and that count value is used to control the cell condition.

39 Claims, 6 Drawing Sheets

RELIABLE CONGESTION CONTROL IN A CDMA-BASED MOBILE RADIO COMMMUNICATIONS SYSTEM

RELATED APPLICATION

This application is related to commonly-assigned U.S. patent application Ser. No. 09/736,574, entitled "Congestion Control in a CDMA-Based Mobile Radio Communications System," filed on Dec. 15, 2000, the disclosure of which is incorporated herein by reference.

FIELD OF THE INVENTION

The present invention relates to mobile radio communications, and more particularly, to reliable congestion control in a CDMA-based mobile radio communications system.

BACKGROUND AND SUMMARY

In a mobile radio communications system, a mobile radio station communicates over an assigned radio channel with a radio base station. Several base stations are usually connected to a switching node, which is typically connected to a gateway that interfaces the mobile radio communications system with other communications systems. A call placed from an external network to a mobile station is directed to the gateway, and from the gateway through one or more nodes to a base stations which serves the called mobile station. The base station pages the called mobile station and establishes a radio communications channel. A call originated by the mobile station follows a similar path in the opposite direction; however, paging is not performed.

In a spread spectrum, Code Division Multiple Access (CDMA) mobile communications system, spreading codes are used to distinguish information associated with different mobile stations or base stations transmitting over the same frequency band. In other words, individual radio "channels" correspond to and are discriminated on the basis of these codes. Each coded signal overlaps all of the other coded signals as well as noise-related signals in both frequency and time. By correlating a composite signal with one of the distinguishing spreading codes, the corresponding information can be isolated and decoded.

Spread spectrum communications permit mobile station transmissions to be received at two or more "diverse" base stations and processed simultaneously to generate one received signal. With these combined signal processing capabilities, it is possible to perform a "handover" from one base station to another without any perceptible disturbance in the voice or data communications. This type of handover is typically called diversity handover and may include a "soft" handover between two base stations and a "softer" diversity handover between two different antenna sectors connected to the same, multi-sectored base station.

Because all users of a CDMA communications system transmit information using the same frequency band at the same time, each user's communication interferes with the communications of other users. In addition, signals received by a base station from a mobile station that is close to the base station are much stronger than signals received from other mobile stations located at the base station cell boundary. As a result, close-in mobile stations may overshadow and dominate more distant mobile communications, which is why this condition is sometimes referred to as the "near-far effect." Thus, control of mobile transmit power level is important in order to prevent such near-far effects. Power control is also needed to compensate for changing physical characteristics of a radio channel. Indeed, the signal propagation loss between a radio transmitter and receiver varies as a function of their respective locations, obstacles, weather, etc. Consequently, large differences may arise in the strength of signals received at the base station from different mobiles.

Ideally, all mobile-transmitted signals should arrive at the base station with about the same average power irrespective of the path loss to the base station. By regulating transmit power to the minimum necessary to maintain satisfactory call quality, capacity at the mobile radio communications system can be increased approximately seventy percent as compared with an unregulated system, (assuming that all the calls or connections have the same target signal-to-interference ratio). In addition, mobile stations consume less energy when transmit power levels are maintained at a lowest possible level, thereby reducing battery drain which results in mobile stations lighter in weight and smaller in size.

If the transmission power from a mobile signal is too low, (for whatever reason), the receiving base station may not correctly decode a weak signal, and the signal will have to be corrected (if possible) or retransmitted. Erroneous receipt of signals adds to the delay associated with radio access procedures, increases signal processing overhead, and reduces the available radio bandwidth because erroneously received signals must be retransmitted. On the other hand, if the mobile transmission power is too high, the signals transmitted by the mobile station create interference for the other mobile and base stations in the system.

A significant problem in CDMA systems with transmitting too much power is the so-called "party effect." If one mobile transmits at too high of a power level, (a person is talking too loudly at a party), the other mobiles may increase their power levels so that they can be "heard," (over the loud talker), compounding the already serious interference problem. As each mobile increases its transmit power, (becomes a loud talker), the other mobiles react by raising their transmit powers. Soon all mobiles may be transmitting at maximum power with significantly degraded service and diminished capacity. Thus, while transmit power control is important in any mobile radio communications system, it is particularly important to the performance and capacity of a CDMA-based mobile radio communications system.

One parameter affecting the capacity of a CDMA-based system that can be measured by a base station is the total uplink (from mobile station-to-base station) interference level at the base station. The uplink interference includes the sum of all radio beams that reach a receiver in the base station for a specific radio frequency carrier, plus any received noise or interference from other sources. Because of the importance of interference level to the capacity of the CDMA-based radio network, a radio network controller normally receives measurement reports from radio base stations including periodic uplink interference and downlink power measurements. These measurement reports may be used by call admission and congestion control functions of the radio network controller. If the downlink and uplink interference levels are sufficiently low, the admission control function may "admit" a new call request and allocate the appropriate radio resources, assuming other conditions are met, e.g., there are sufficient radio resources currently available. However, if there are insufficient resources or the cell is at capacity or in an overload condition, the admission control function may restrict or reduce the amount of traffic and thereby interference. For example, new mobile connection requests may be rejected, data throughput may be reduced, data packets delayed, handovers to other frequencies/cells forced to occur, connections terminated, etc. Of course, these types of actions should be employed only where necessary; otherwise, the cellular network services and capacity are unnecessarily reduced.

Accordingly, it is an important goal in a cellular radio system to optimize the capacity of a particular cell without overloading that cell. Some type of metric is needed that provides an accurate measurement or other indicator of the current capacity, congestion level, or load in a cell. One possible metric is received signal strength as measured by the base station. Measurement of total received signal strength can be made using some sort of power sensor such as a diode or a resistor. For example, the total received voltage detected across the diode or the total heat generated by the resistor can be used to indicate the total received signal strength.

Unfortunately, a limitation with this measurement-based metric is accuracy. It is very difficult to accurately measure total uplink received power using these types of sensors because the outputs of such sensors change with temperature, aging, component tolerances, etc. Thus, while a desired measurement accuracy of the total uplink received power or interference level may be +/−1 dB (or less), the actual measurement accuracy possible with such absolute value measurement techniques may only be +/−3–5 dB, when considering economic and product restrictions like manufacturing cost, volume, power consumption, etc.

Such a margin means that the maximum capacity of a cell must account for this uncertainty. To guarantee that the power or interference level does not exceed a particular maximum value in a cell, it is necessary to include a margin that equals the largest possible error. In other words, the maximum capacity for a cell must be designed lower than necessary in order to account for the fact that the power or interference level measurement might well be 5 dB lower than the actual power or interference level. The price for such margins of safety because of uncertain measurement is high. The loss in capacity between a power or interference level measurement uncertainty of +/−1 dB and +/−3–5 dB is on the order of twenty to forty percent.

Another metric that might overcome the difficulties with accurately measuring the absolute received power or interference level in a cell is a measurement of the variance or standard deviation of received power or interference. This variance metric is useful because it only measuring a relative value, i.e., how fast the measured power is changing. Thus, the absolute measurement accuracy is not as important as with the previous metric. The underlying premise of such a variance metric is that as the loading of a cell increases, so does the variance of the received power. One problem with this approach is that too much time is needed to obtain the necessary statistics to calculate the variance.

As described in the commonly-assigned related application referenced above, the present invention employs a metric that overcomes the problems with the absolute measurement and variance measurement metrics. Rather than measuring the absolute or relative value of a particular radio parameter or condition in a cell, e.g., congestion, overload, power or interference level, etc., the load situation of a cell is determined without the need to measure that load condition by counting transmit power control commands issued in the cell. Based on those issued commands, the condition of the cell may be regulated if desired, e.g., admission and/or congestion control, transmit power control, etc. In one example implementation, the number of increase transmit power commands issued in a cell over a particular time period is determined relative to a total number of transmit power commands, (i.e., both increase and decrease), issued in the cell for that same time period. If the number of increase transmit power commands relative to the total number of transmit power commands exceeds a threshold, an overload condition may be indicated. When an overload is indicated, an action may be taken that reduces the number of increase transmit power commands issued in the cell.

One drawback regulating a cell condition based on observed values of transmit power control commands issued in the cell is that there may be situations in which those commands are not reliable because they are not implemented by the receiving node. For example, if the transmitted commands are corrupted or lost over the radio interface, they will not be implemented. In diversity handover situations, a mobile station follows power control commands of the "dominant" base station that is usually satisfied with the lowest transmitted power, i.e., the base station with the lowest path loss. The other diversity base stations typically would like the mobile station to transmit with more power because they are farther away and have a greater path loss. Accordingly, the dominant diversity base station will likely transmit more power-down commands than non-dominant diversity base stations. The mobile station will not follow both a power-up and a power-down command at the same time. One of the commands is ignored and most often, it is the power-up command. Ignored commands should not be counted. Still further, a mobile station may not be able to further increase its power due to the fact that it has reached its maximum power limit. At that point, any power-up command is ignored. However, the ignored commands are counted. In all of these situations, all the transmit power commands would be normally counted as valid if they were issued in the cell, irrespective of whether they have not been implemented. Such an indiscriminate command count value is not reliable. Unreliable count values may result in "false alarms" or other undesired network reactions.

One approach to avoid such false alarms or other undesired network reactions, as described in the commonly-assigned, above-referenced application, is to measure the interference level in the cell as a "double check" of the transmit power control command count output. However, as already explained, inexpensive interference measurement implementations are inaccurate. In addition, the measurement of uplink interference also contains power from external sources that cannot be filtered out which further decreases the accuracy of that measurement.

The present invention provides an inexpensive and effective way to provide reliable cell congestion control. Transmit power control commands issued in the cell are detected, and the reliability of the issued transmit power commands is determined. A condition in the cell, e.g., congestion level, is controlled based on those issued transmit power commands which are determined to be reliable. Reliably issued transmit power control commands are consistent with a corresponding transmit power control decision made by the receiver of the command, where the decision is not influenced by a maximum or minimum power level. One example of a reliable command includes a command that is actually implemented by the receiver of the command. Those commands that are inconsistent with the mobile's transmit power control decision, (one example being commands that are not implemented), are deemed unreliable, and therefore are not considered in controlling the condition of the cell. In a preferred example implementation of the present invention, only reliably issued and implemented transmit power control commands are counted, and that count value is used to control the cell condition.

In a diversity handover situation between a mobile terminal and first and second diversity base stations, unreliable transmit power control commands include those issued from one of the diversity base stations which are ignored by the mobile terminal. In one example implementation of the invention in this context, only one of the diversity base stations is selected for each of multiple time periods during that diversity handover communication. Those commands issued by a selected base station may be treated as reliable. Another measure of reliability could be the frequency with which one of the diversity base stations is selected. If that frequency meets a threshold, the transmit power commands issued by that one diversity base station to the mobile terminal are treated as reliable.

In a detailed example implementation of this latter frequency-based approach, the one diversity base station is selected by the mobile station using a site selection diversity transmission (SSDT) indicator. A cell selection comparator generates an output when a SSDT cell identifier broadcast by the mobile station matches an identifier of the current cell. That output is averaged over time. The more selections per time interval, the higher the average. A threshold detector generates an enabling signal if the averaged cell selection comparator output exceeds a threshold. A logic detector passes transmit power control commands to the counter for which the enabling signal is received from the threshold detector.

After determining which issued transmit power control commands are reliable, the number of increase transmit power commands is determined either relative to the total number of reliable transmit power commands issued in the cell or the number of reliable decrease transmit power commands. That number is easily determined using a simple counter. If the counter output exceeds a threshold, action is taken to reduce the number of increase transmit power commands in the cell.

Additional, optional features may be used to advantage along with the reliable power command control procedures. For example, averaging may be employed to reduce reaction to transient fluctuations. Furthermore, it may be desirable to detect the rate of change of a monitored signal in order to vary a threshold at which some network reaction is taken. For fast changes, a threshold value could be decreased to prompt a quicker network reaction to the unstable situation. Still further, it may be desirable to also consider an uplink power or interference value in the cell measured using an inexpensive sensor (despite its inaccuracy) along with the counted reliable transmit power command output as a "double-check."

By observing values of reliable transmit power control commands (TPCCs) issued in a cell over a particular time period, the present invention provides an effective, efficient, and inexpensive method to accurately detect and regulate the condition of a cell. Because the TPCC metric is not measured, a margin of error need not be used which may significantly reduce capacity in the cell. The amount of traffic and/or power level in a cell can therefore be regulated to optimize the cell's capacity without danger of an unstable or undesirable situation, e.g., a "party effect" ramp-up of transmit power/interference. By ensuring that the issued transmit power control commands are reliable and actually implemented, the present invention further enhances the accuracy of the TPCC metric, as well as cell control operations based upon that TPCC metric.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, the present invention may be implemented in any cellular radio communications system. One specific, non-limiting application of the invention is in a CDMA radio communications system. A preferred context in a CDMA system is in an uplink transmit power control context. However, the invention may be employed in a downlink transmit power control context as well.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
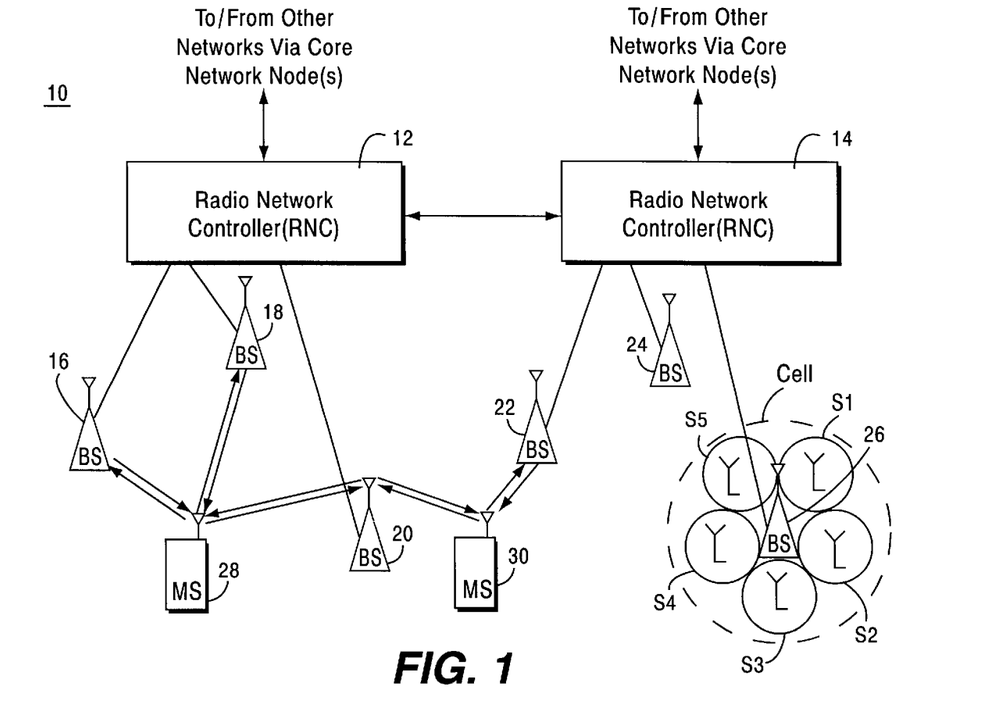
FIG. 1 illustrates an example mobile radio communications network in which the present invention may be employed.

An example mobile radio cellular communications system 10 is shown in FIG. 1 and may be, for example, a CDMA or a wideband CDMA communications system. Radio network controllers (RNCs) 12 and 14 control various radio network functions including for example radio access bearer setup, diversity handover, etc. More generally, each RNC directs mobile station calls via the appropriate base station(s). Radio network controller 12 is coupled to a plurality of base stations 16, 18, and 20. Radio network controller 14 is coupled to base stations 22, 24, and 26. Each base station serves a geographical area referred to as a cell, and a cell may be divided into plural sectors. Base station 26 is shown as having five antenna sectors S1–S5. Each sector also has a corresponding cell area so that in this situation the base station serves five cells. The base stations are coupled to their corresponding radio network controller by a digital link established via dedicated telephone lines, optical fiber links, microwave links, etc. Both radio network controllers 12 and 14 are connected with external networks such as the Public Switched Telephone Network (PSTN), the Internet, etc. through one or more core network nodes like a mobile switching center (not shown) and/or a packet radio service node (not shown).

In FIG. 1, two mobile stations 28 and 30 are shown communicating with plural base stations in diversity handover situations. Mobile station 28 communicates with base stations 16, 18, and 20, and mobile station 30 communicates with base stations 20 and 22. A control link between radio network controllers 12 and 14 permits diversity communications to/from mobile station 30 via base stations 20 and 22. Each radio communication channel established between the mobile station and a base station has an uplink component and a downlink component. Since multiple communications utilize the same radio frequencies in CDMA communication, spreading codes along with other well-known CDMA techniques are used to distinguish between the various mobile station and base station communications. In this example embodiment, the term "channel" refers to a CDMA channel which, for any mobile station, is defined in terms of an RF frequency and a particular code sequence.

Figure 2:
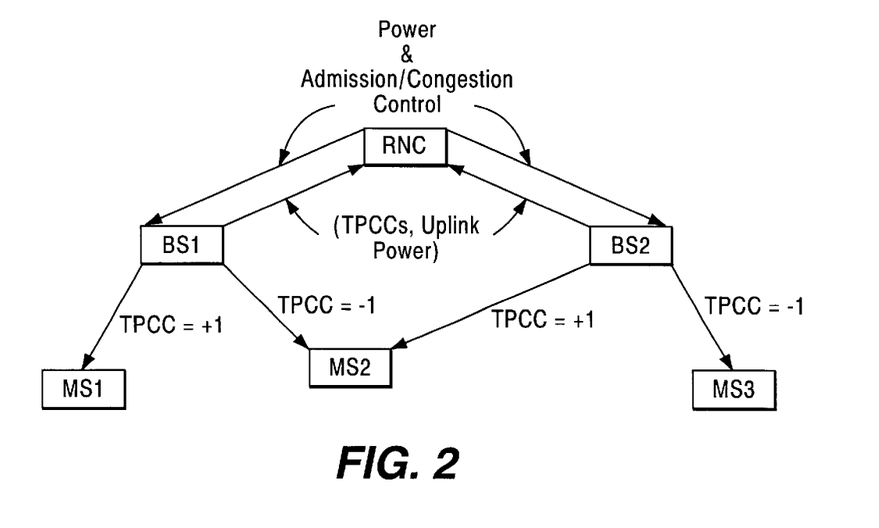
FIG. 2 is a diagram illustrating uplink power control and admission/congestion control in the mobile radio communications network of FIG. 1.

FIG. 2 is a diagram illustrating power control and admission and congestion control signaling. For purposes of illustration, but not for limitation, the following example embodiments of the present invention are described in the context of an uplink (from mobile-to-base) transmit power control situation. In uplink power control, transmit power control commands are sent from a base station to each mobile station with an active connection in short time intervals, e.g., every frame, commanding that mobile station to increase or decrease its transmit power, e.g., 0.5 dB or 1.0 dB. However, it will be understood that the present invention may be implemented in the downlink context (from base station-to-mobile station) in which the transmit power commands are sent from the mobile station to the base station ordering the base station to increase or decrease its transmit power.

In FIG. 2, there are example signaling links between a radio network controller (RNC), two base stations BS1 and BS2, and three active mobile stations MS1, MS2, and MS3. The traffic links are not shown. Base station BS1 is involved in a direct communication with MS1 as well as a diversity communication with MS2. Because of MS1's distance from BS1, base station BS1 sends a transmit power control command (TPCC) requesting that MS1 increase (+1) its transmit power by some small incremental step, e.g., 0.5 dB or 1.0 dB.

MS2 is in diversity handover with base stations BS1 and BS2. Because MS2 is relatively close to BS1 and is transmitting with greater than necessary power for satisfactory reception by BS1, BS1 sends a decrease power command (−1) to MS2. On the other hand, because mobile station MS2 is relatively far away from base station BS2, BS2 sends an increase (+1) transmit power control command to mobile station MS2. In a diversity handover situation, it may be advisable for a mobile station to only increase its transmit power only if every one of the diversity base stations requests a power increase. Otherwise, the mobile station decreases its power. In the illustrated diversity situation, because the mobile station MS2 receives one decrease and one increase power command from BS1 and BS2, respectively, MS2 decreases its power. Similarly, because MS3 is relatively close to base station BS2, and BS2 is receiving a signal from MS3 at a more than satisfactory power level, a decrease power command (−1) is issued to MS3.

Thus, when diversity handover base stations send different transmit power control commands to the mobile station, the mobile station must choose one of those commands and ignore the other. Typically, the mobile station chooses the power-down command. Accordingly, the power-up command is ignored and not implemented by the mobile station. As a result, the power-up command that is ignored is unreliable and therefore should not be counted. More generally in the uplink power control context, a reliable transmit power control command is one that is consistent with the corresponding transmit power control decision actually made by the mobile station. Thus, a reliable command includes a command that is actually implemented by the mobile station. A reliable command also includes a command that would be implemented by the mobile station if there were no maximum or minimum power level. In other words, if a mobile station is already transmitting at a maximum power level, any more power increase commands will not be implemented. However, a power increase command is consistent with the transmit power control decision of the mobile to increase its power to the maximum level. This power increase is important information that reflects the load situation in the cell, and therefore, should be detected. An unreliable command is inconsistent with the transmit power control decision of the mobile station, where that decision is not influenced by maximum or minimum power levels as described above.

Figure 3:
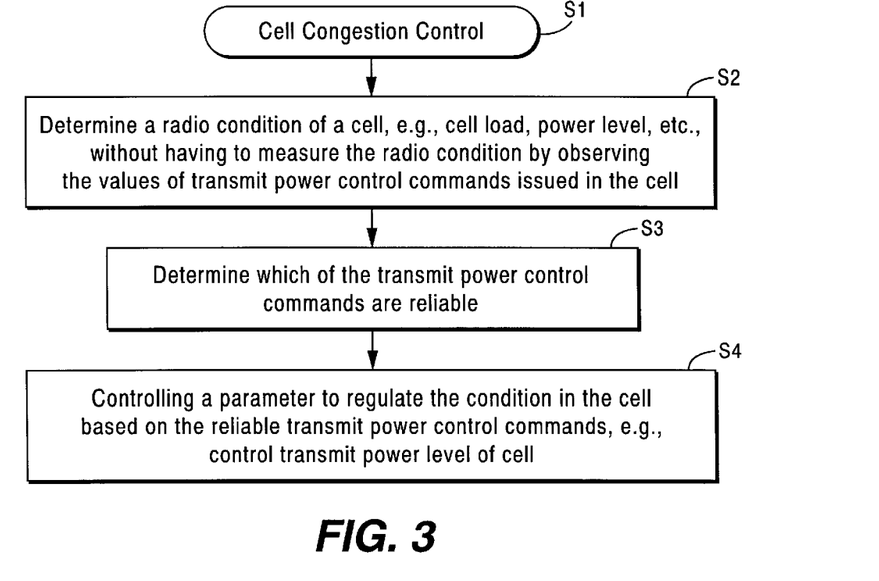
FIG. 3 is a flowchart diagram of procedures for implementing one example embodiment of the present invention.

In a first example embodiment illustrated in flowchart form in FIG. 3, cell congestion is regulated using a reliable metric that is also not dependent upon measuring a particular radio parameter or condition such as uplink interference or power. As described above, such measurements are not accurate and inject an uncertainty that results in unnecessary lost cell capacity. In the cell congestion control routine (S1) of FIG. 3, a radio condition of a cell, e.g., cell load, power level, etc. is determined without having to measure the radio condition by observing transmit power control commands issued in the cell over a particular time period (step S2). The observed transmit power control commands issued in the cell are processed to determine which of those commands is reliable, i.e., consistent with the transmit power control decision of the mobile station (step S3). For example, issued transmit power control commands that are implemented by the receiver of those commands are deemed reliable. Issued commands that are inconsistent with the receiver's transmit power control decision are deemed unreliable. Based on reliable transmit power control commands, the condition in the cell may be regulated, e.g., the transmit power level of the cell is increased or decreased, new calls/services are admitted or denied, etc. (step S4).

In a normal traffic situation, the number of power-up commands should on average equal the number of power-down commands. Thus, a potential party effect situation will be indicated by an increasing number of power-up commands. If the number of power-up commands reaches a certain level, a load reduction or other appropriate action may be taken.

Figure 4:
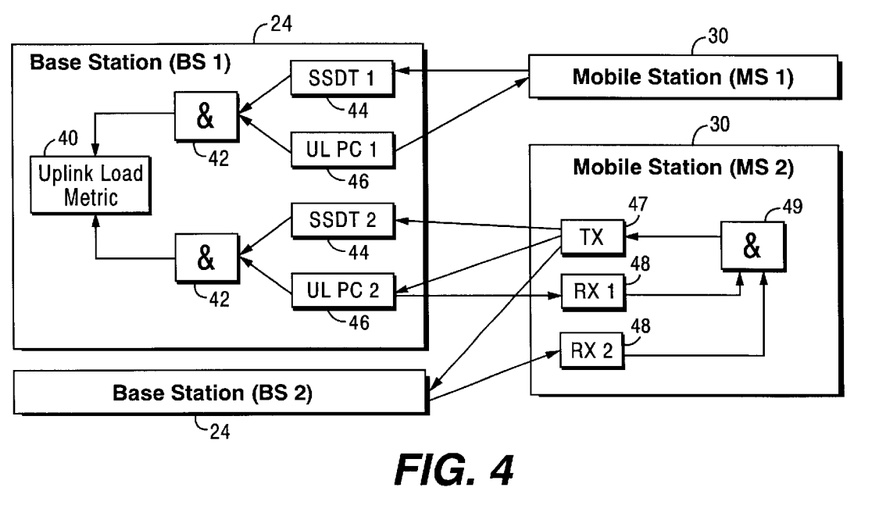
FIG. 4 is a diagram illustrating one example implementation of the present invention.

FIG. 4 illustrates in a function block format another example embodiment of the invention relating to a diversity handover communication. This example shows one way the base and mobile stations may be involved in determining the reliability of issued transmit power control commands in a diversity handover situation. Some of the functions performed by the base station may be performed in the RNC, if desired. Two base stations BS1 and BS2 are indicated by reference numeral 24. Base station BS1 is communicating with both mobile stations MS1 and MS2 (generally indicated by reference numeral 30). A diversity handover communication with mobile station MS2 is supported by both base stations BS1 and BS2. In diversity handover situations, the mobile station may receive different commands from the diversity base stations. If so, the mobile will usually only select one of those commands—typically a power-down command. Therefore, a preferred example approach for determining the reliability of issued transmit power control commands in this situation is to determine whether the mobile station actually implemented a transmit power control command issued by the diversity base station. One example mechanism for making that determination is to use a Site Selection Diversity Transmission (SSDT) indicator issued by the mobile station. The SSDT function is provided as an option in the Third Generation Partnership Project (3GPP) specification for WCDMA mobile communications. Of course, other types of indicators may be employed.

Each of the base stations BS1 and BS2 includes an uplink load metric block 40, and two logic "AND" blocks 42 that logically combine the outputs of a respective SST block 44 and uplink power control block 46. Each mobile station includes a transmitter 47, receivers 48, and a logic "AND" gate 49. The uplink power control blocks 46 of the diversity base stations BS1 and BS2 each send a transmit power control command (either power-up or power-down) to the mobile station MS2. The TPCCs from BS1 and BS2 are respectively received at receivers RX1 and RX2 and forwarded to the logic "AND" device 49. Tis logic AND device 49 logically combines the received transmit power control commands. As mentioned above, if the two commands are both to power-up, the logic device 49 generates an increase power command output to increase the transmit power level of the mobile station transmitter 47. Otherwise, the logic device 49 generates a decrease transmit power command.

With the SSDT function implemented, only one base station transmits to the mobile station. The mobile station measures the received base station signals and selects the base station with the best signal by measuring the common pilot signals received from each base station. This selection is conveyed in an SSDT message sent by the mobile's transmitter 47 to the SSDT blocks 44 of both base stations BS1 and BS2. When the logic AND block 42 detects the presence of both an SSDT selection signal from block 44 and the issuance of a transmit power control command from block 46, it communicates the value of the issued transmit power control command to the uplink load metric determination device 40 as a reliable transmit power control command. The uplink load metric block 40 then determines, based on the number of reliable issued transmit power control commands for a particular cell, if and how to regulate the condition of the cell. Reliability of issued TPCCs is determined by selection of the base station transmitter, and more particularly in the SSDT example, by the SSDT indicator selecting the base station that issued the TPCC.

Figure 5:
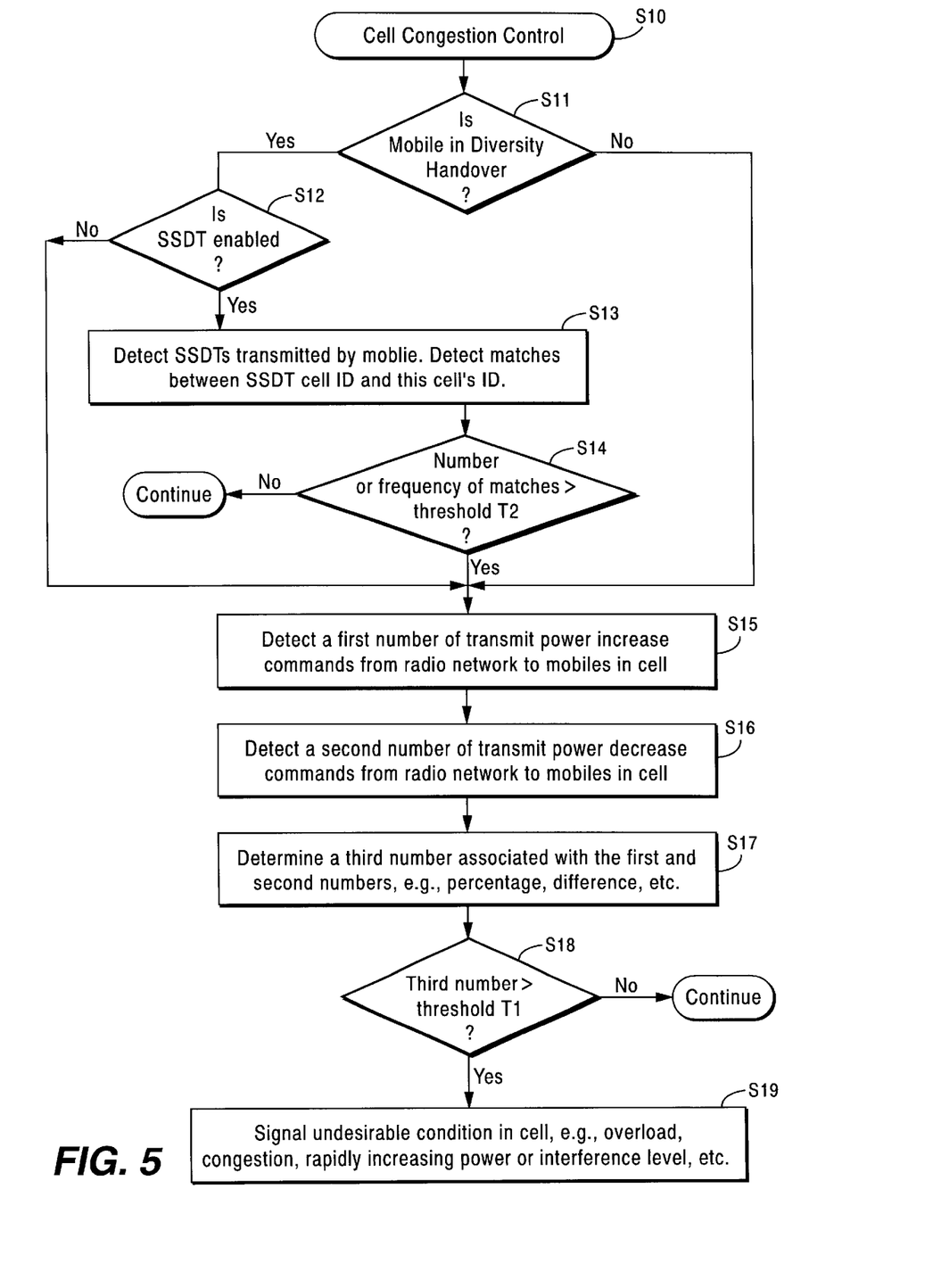
FIG. 5 is a flowchart diagram of procedures for implementing another example embodiment of the present invention.

The cell congestion control routine (S10) in FIG. 5 is a non-limiting, specific example of how transmit power control commands can be observed, determined as reliable, and used in accordance with an SSDT implementation of the invention. A decision is made whether the mobile is in diversity handover (step S11). If not, control proceeds to step S15. If the mobile station is in diversity handover, a determination is made whether the SSDT feature is enabled (step S12). If not, control proceeds to step S15. If it is, the SSDT indicators transmitted by the mobile station are detected at each base station. At each base station, the SSDT cell identifier is compared with the base station cell identifier (step S13). A decision is made whether the number or frequency of comparison matches exceeds a threshold T2 (block S14). If so, the issued transmit power control commands are determined to be reliable, and control proceeds to step S15.

At step S15, a first number of transmit power increase commands is detected from the radio network to mobiles within a cell. A second number of transmit power decrease commands is detected from the radio network to mobiles in that cell (step S16). A third number is then determined associated with the first and second numbers (step S17). For example, the third number might be the percentage of power-up commands relative to a total number of power-up and power-down commands. Alternatively, the third number could be a difference between power-up and power-down commands. A decision is made (step S18) whether the third number is greater than a threshold T1. If it is, an undesirable condition in the cell is signaled (step S19). For example, there might be an indication of an overload condition, a congestion situation, a rapidly increasing power situation, an interference limit, etc. If warranted, action may be taken by the radio network to reduce congestion by blocking admission attempts, reducing transmit power levels, or by taking some other action that results in a reduction of the third number.

Figure 6:
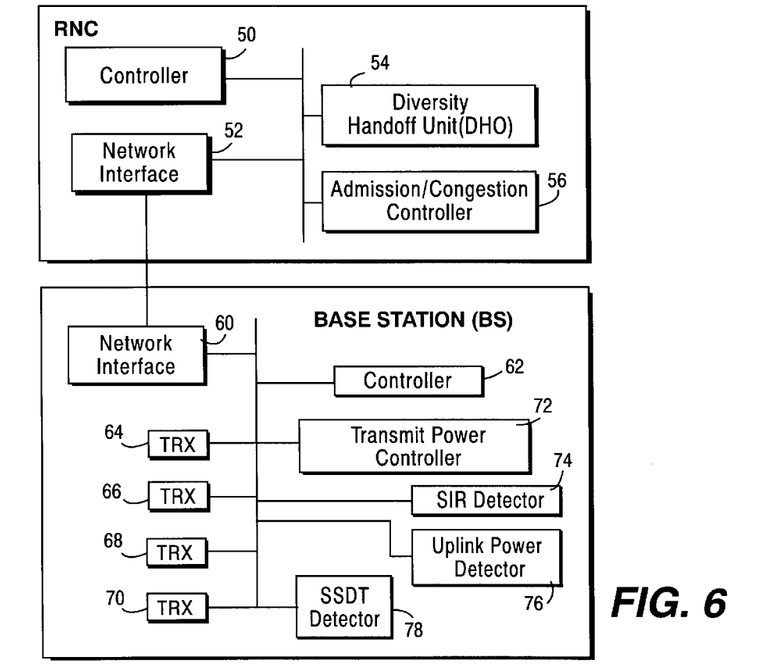
FIG. 6 is a function block diagram illustrating a radio network controller and a base station.

Some additional details of a base station and a radio network controller that may be used to implement the invention are now provided in conjunction with FIG. 6. Each radio network controller (RNC) includes a network interface 52 for interfacing communications with various base stations. Within the RNC, the network interface 52 is connected to a controller 50 and to a diversity handover unit (DHO) 54. Diversity handover unit 54 performs functions required for establishing, maintaining, and dropping diversity connections, such as diversity combining, diversity splitting, power control and other link related radio resource control algorithms. An admission/congestion controller 56 also responds to requests to allocate new radio resources and takes action where necessary to regulate traffic conditions in the cell if an overload or congested condition is detected. The RNC may include other control/functional units not necessary to the understanding of the invention.

Each base station (BS) includes a corresponding network interface 60 for interfacing with the RNC. In addition, the base station includes a controller 62 connected to a one or more transceivers. In this example, a plurality of transceivers (TRX) 64, 66, 68, and 70 are shown coupled to a transmit power controller 72. Controller 62 controls the overall operation of the base station as well as the establishment, maintenance, and release of radio connections. Representative transceivers 64–70 are individually assigned to specific communications with mobile stations. At least one transceiver is employed as a common control channel over which the base station transmits common signaling such as pilot, synchronization, or other broadcast signaling. Mobile stations within or near that base station's cell(s) monitor the common channel. Transmit power controller 72 performs power control operations based on messages received from the RNC and/or from mobile stations. One or more signalto-interference ratio (SR) detectors 74 (only one is shown for purposes of illustration) may be used to detect the SIR of signals received from mobile stations. Other signal quality detectors may be employed, e.g., CIR, RSSI, etc. such as an uplink power detector 76. Detector 76 may be a diode or thermal resistor for measuring total uplink received power or interference level at the base station. An SSDT detector 78 detects SSDT signals sent from mobile stations and provides the value of those SSDT indicators to controller 62 for use in determining whether issued transmit power control commands from the transmit power controller 72 to a particular mobile station are reliable.

Figure 7:
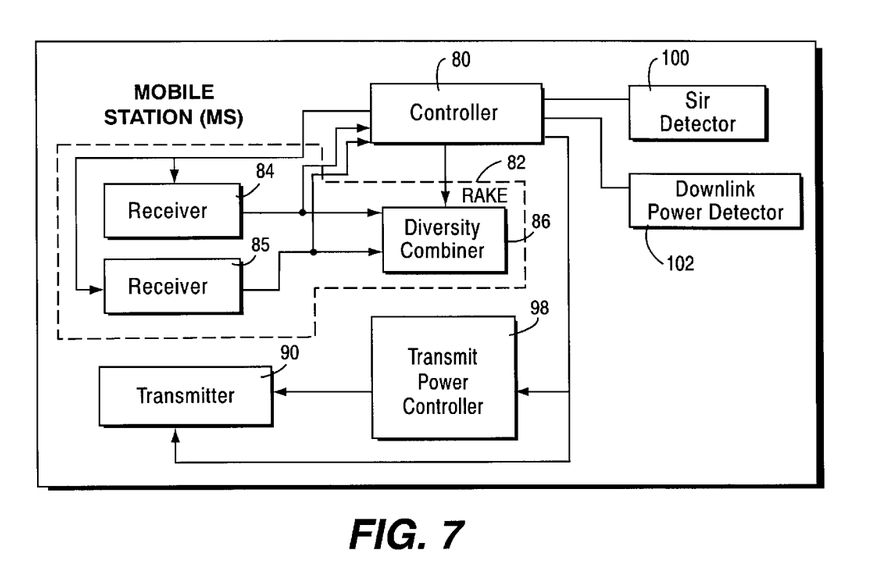
FIG. 7 illustrates a function block diagram of a mobile station.

FIG. 7 illustrates additional details of an example mobile station. The mobile station includes a controller 80 connected to a RAKE receiver 82, a transmit power controller 88, a transmitter 90, a SIR (or other signal quality) detector 100, and a downlink power detector. The RAKE receiver 82 includes plural receivers 84 and 85 (there may be additional receivers as well) connected to a diversity combiner 86. One or more signal strength detectors (not shown) or similar detector(s) are employed in the mobile receiver 82 to detect the signal strength or other parameter of received signals. The transmissions from base stations are received as multipaths in the receivers 84 and 85, combined in diversity combiner 86, and processed as one signal. Transmit power controller 98 determines the transmit power level, e.g., as a signal-to-interference ratio (SIR)) of the received, diversity-combined signal.

The transmit power control (TPC) commands may include one or more bits which indicate a desired increase in transmit power, a desired decrease in transmit power, or in some cases, no change in transmit power. Of course, any number of bits or bit assignments is possible. In order to compensate for rapidly changing transmission conditions, transmit power control commands may be sent very frequently, e.g., every 0.625 millisecond time slot.

Figure 8:
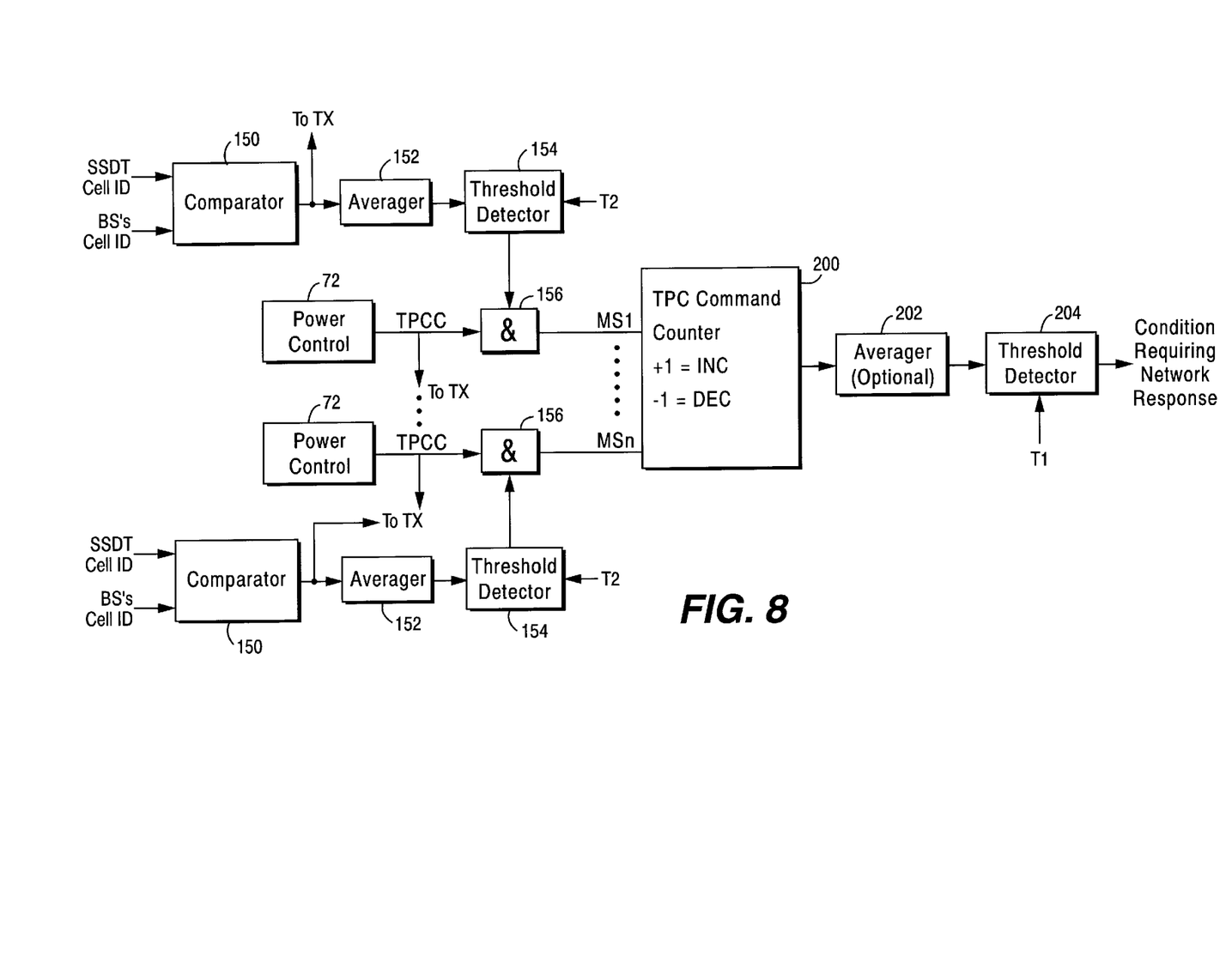
FIG. 8 illustrates an example of a reliable transmit power control command counter implementation of the present invention.

FIG. 8 shows a TPC command counter-based, example implementation of the present invention. The transmit power controller 72 in the base station provides transmit power control commands (TPCCs) both to its transmitters engaged in communication with a mobile station and to corresponding logic AND gates 156. When enabled, the AND gate 156 coupled the TPCC to a TPC command counter 200. A comparator 150 compares the SSDT cell ID, provided in the SSDT information transmitted by the mobile station to diversity base stations, with this base station's cell ID. If the two cell IDs match, the output activates the base station transmitter. The output may also be provided to an optional averager 152. The optional averager 152 acts as a low pass filter to ensure that very brief or transient outputs from the comparator 150 do not unnecessarily activate an optional threshold detector 154. As the number of matches between the SSDT cell ID and the base station cell ID increases, the average value provided to the optional threshold detector 154 increases to a point where a threshold value T2 is exceeded, at which point, an enabling signal is sent to the logic gate 156. In other words, when the number of times, or frequency at which, this base station is selected by the mobile station for purposes of transmitting to the mobile station is large enough, the TPCCs issued by this selected base station's power controller 72 to that mobile station are viewed as reliable, and therefore, are submitted to the TPC command counter 200.

The comparator 150 (and optionally the averager 152 and threshold detector 154) determines that the transmit power control commands are reliable. Having selected this base station, the mobile station follows (to the extent it can) the transmit power control commands issued by that base station. In this way, these TPC are consistent with the transmit power control decision of the mobile station, assuming that decision is not influenced by a maximum or minimum power level. The TPC command counter 200 receives reliable TPCCs for each active mobile station communication in the cell. The TPC counter 200 may be implemented using hardware or software in the base station controller 62, but it could also be implemented in the radio network controller, if desired. The TPC command counter 200 may be clocked at a frequency that accommodates the frequency at which TPC commands are issued. For example, if TPC bits are issued every 0.667 millisecond time slot, and 60 mobile users are assumed per cell, 80 kbits of data must be processed per second by the counter. If the counter has a 8-bit parallel input, the counter needs to be clocked at 11.2 kbps, a rate easily handled with current signal processing electronics.

Returning to FIG. 8, the transmit power control command counter 200 detects transmit power increase and decrease commands from the logic gates 156 associated with each active mobile user in a particular cell, e.g., mobile users 1, 2, 3, ..., n. A reliable increase power command increments the counter 200, while a reliable decrease power command decrements the counter 200. An averager 202 may be used optionally to average the value generated by the counter 200. In this case, the counter output is the difference between the number of reliable increase and decrease power commands. The optional averager 202 effectively "smooths out" any abrupt, momentary changes. A threshold detector 204 detects the output from the counter 200 (or optionally from the averager 202) and compares it with a threshold T1. If the threshold T1 has been exceeded, a signal may be generated indicating a condition requiring radio network attention and/or response. The threshold T1 may be set by calculated design or determined based on empirical data. The condition may be one of congestion, too high an interference value, or other condition requiring possible action by the radio network. Such action might include reducing the transmit power levels of base station and/or mobile station transmitters, reducing services, denying new service requests, or other action.

Figure 9:
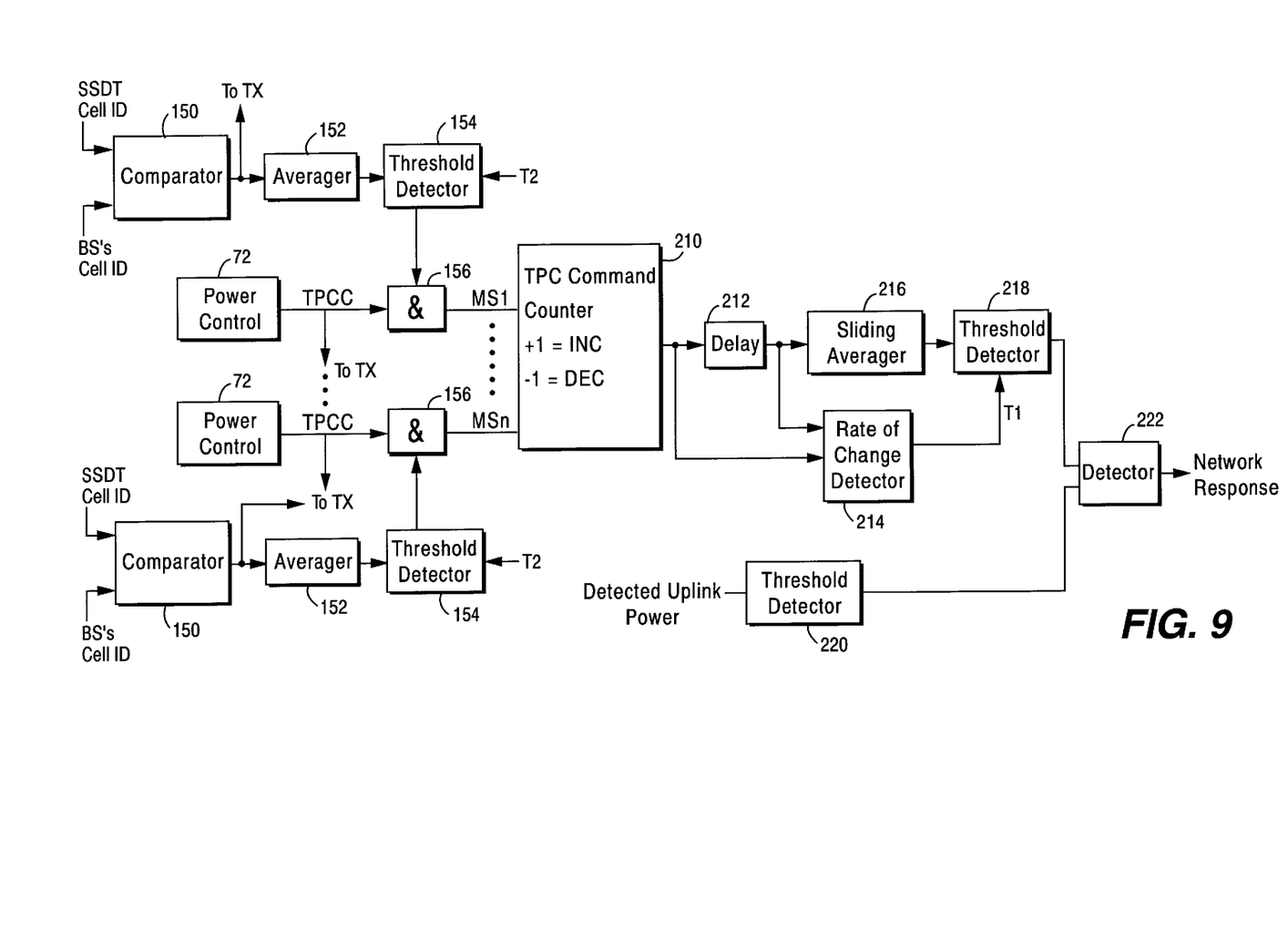
FIG. 9 illustrates another example of a reliable transmit power control command counter implementation of the present invention.

FIG. 9 shows another example embodiment similar to the example embodiment shown in FIG. 8. As in FIG. 8, a TPC command counter 210 detects reliable transmit power increase and decrease commands from each active mobile user in a particular cell, e.g., mobile users 1, 2, 3, ..., n, based on the SSDT base station selection. A reliable increase power command increments the counter 210, while a reliable decrease power command decrements the counter 210. A sliding averager 216 may be used to average the value generated by the counter 210 using a sliding window technique. In this case, the counter output is the difference between the number of increase and decrease power commands. The average is taken of values received within a certain time window. As the window "moves" in time, older values are discarded and newer values are observed. The sliding averager 216 effectively "smooths out" any abrupt, momentary changes, but still provides a reasonably quick response to recent counter outputs that show a sustained increase in the counter output. A threshold detector 218 detects the output from the sliding averager 216. If the comparison detects that the threshold T1 has been exceeded, a signal is provided to a detector 222 which may simply perform a logical operation like an "AND" operation.

A rate of change detector 214 is coupled to the input and output of a delay element 212 interposed between the TPC command counter 210 and the sliding averager 216. The value of the delay may be for example on the order of one frame, e.g., 10 milliseconds. The rate of change detector 214 detects when the counter output is changing in a rapid fashion, indicating perhaps an unstable situation that may require immediate response from the network. In this kind of unstable situation, the rate of change detector 214 varies the value of the threshold T1, e.g., decreases the value of T1 for a rapidly increasing counter output.

There may be situations where additional information may be useful or needed in order to avoid false alarms. For example, an additional parameter such as detected uplink power or interference may be used. In addition to monitoring the values of reliable power control commands transmitted to mobile stations in each cell, each base station also measures the received uplink power or interference level for each cell using an inexpensive (preferably) power sensor, (e.g., a diode or temperature sensitive resistor). The threshold detector 220 detects if the measured uplink power or interference level at the base station exceeds a threshold for the cell. The accuracy of that measurement is not critical because the measurement is simply being used as a "double check" for a condition detected based on an increased number of reliable power-up commands. When the outputs of both threshold detectors 218 and 220 are detected in logic detector 222, a condition requiring a possible radio network response is indicated. Accordingly, each base station may provide to the RNC information for each cell including a current uplink received power or interference measurement, a number of active mobile users per cell for that time interval, the number of increase transmit power commands, and/or the number of decrease transmit power commands for that interval.

A situation that may result in a false alarm is a so-called "stadium" scenario. Consider the situation where a number of mobile users are attending a large sporting event at a stadium. At the end of that event, many of those mobile users will move en masse to their cars and leave the stadium. During that en masse departure, many of the users will be using their cell phones at the same time, which will produce a large number of power-up commands. However, the interference detected at the base station will not increase because the users will all be leaving in their cars in different directions such that the path loss from the departing mobile users offsets the increased number of power-up commands. Of course, if the uplink power measurement was neglected, the offsetting path loss would not be detected, possibly resulting in a false alarm. Therefore, the uplink power measurement, even though it may not be particularly accurate, may still be useful in avoiding false alarms in this "stadium" scenario.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. For example, although the preferred example embodiments described above are in the context of an uplink power control context, the present invention may also be applied in a downlink power control context. In addition, the admission, congestion, traffic, and power control procedures may be implemented at the RNC, at the base station, or some combination of both. Accordingly, it is intended that the invention be limited only by the scope of the claims appended hereto.

What is claimed is:

1. In a cellular mobile radio communications system supporting communications over a radio interface between a radio network and mobile terminals, a method comprising:

monitoring transmit power control commands issued in a cell in the radio network;

determining the reliability of issued transmit power commands;

monitoring a number of reliable increase transmit power commands issued in a cell over a time period relative to a total number of reliable transmit power commands issued in the cell for that time period; and if the number of reliable increase transmit power commands relative to the total number of reliable transmit power commands exceeds a threshold, taking action to reduce the number of increase transmit power commands in the cell.

2. The method in claim 1, further comprising:

determining a load condition in the cell based on issued transmit power commands determined to be reliable; and controlling the load condition in the cell based on issued transmit power commands determined to be reliable.

3. The method in claim 2, wherein the load condition relates to an interference or congestion level in the cell.

4. The method in claim 1, wherein a reliable issued transmit power control command includes an issued transmit power control command that is consistent with a corresponding transmit power control decision made by a receiver of the issued command, and wherein an unreliable issued transmit power control command includes an issued transmit power control command that is inconsistent with a corresponding transmit power control decision made by the receiver.

5. The method in claim 4, further comprising:

considering only reliable transmit power control commands in controlling the condition in the cell.

6. The method in claim 4, further comprising:

registering in a counter only reliable transmit power control commands.

7. The method in claim 1, further comprising:

identifying a diversity handover communication between a mobile terminal and first and second diversity base stations;

wherein unreliable transmit power control commands include issued transmit power commands from one of the diversity base stations ignored by the mobile terminal.

8. In a cellular mobile radio communications system supporting communications over a radio interface between a radio network and mobile terminals, a method comprising:

monitoring transmit power control commands issued in a cell in the radio network;

determining the reliability of issued transmit power commands;

controlling a condition in the cell based on issued transmit power commands determined to be reliable;

identifying a diversity handover communication between a mobile terminal and first and second diversity base stations, one of the diversity base stations being selected for each of multiple time periods during the diversity handover communication, determining a frequency at which the first diversity base station is selected; and if the frequency meets a threshold, treating transmit power control commands issued by the first diversity base station to the mobile terminal as reliable.

9. The method in claim 8, wherein the one diversity base station is selected by a mobile terminal using a site selection diversity transmission (SSDT) indicator.

10. In a cellular mobile radio communications system supporting communications over a radio interface between a radio network and mobile terminals, a method comprising:
monitoring transmit power control commands issued in a cell in the radio network;
determining the reliability of issued transmit power commands;
monitoring a first number of reliable increase transmit power commands issued in a cell over a time period relative to a second number of reliable decrease transmit power commands issued in the cell for that time period; and
if a difference between the number of reliable increase transmit power commands and the number of reliable decrease transmit power commands exceeds a threshold, taking action to reduce the number of increase transmit power commands in the cell.

11. The method in claim 10, further comprising:
measuring a value associated with the cell condition, and
using the measured value to aid in determining the reliability of issued transmit power control commands.

12. The method in claim 11, wherein the measured value is a received power level in the cell.

13. In a mobile radio communications system supporting communications over a radio interface between a radio network and mobile terminals, a method comprising:
identifying transmit power commands that are determined to be reliable without having to measure whether the commands contain errors, wherein the commands are sent from a base station in a cell in the radio network to mobile terminals;
detecting a first number of reliable transmit power increase commands from the radio network to mobile terminals in the cell in a time period;
detecting a second number of reliable transmit power commands from the radio network to mobile terminals in the cell in the time period;
determining a third number associated with the first and second numbers for the time period;
comparing the third number to a first threshold; and
if the third number exceeds the first threshold, signaling a congestion condition in the cell,
wherein the second number is a number of reliable decrease transmit power commands in the time period, and the third number is a difference between the first number and the second number.

14. The method in claim 13, wherein the second number is a total number of reliable transmit power commands in the time period, and the third number is a percentage of the first number to the second number.

15. The method in clam 13, further comprising:
determining an average of the third number over a predetermined time frame,
wherein the averaged third number is compared to the first threshold.

16. The method in claim 13, further comprising:
measuring a signal level in the cell;
comparing the measured signal level in the cell to a level threshold; and
if the measured level in the cell exceeds the level threshold and if the third number exceeds the first threshold, signaling a congestion condition in the cell.

17. The method in claim 13, wherein a reliable transmit power control command includes a transmit power control command that is consistent with a transmit power control decision made by a receiver of the command, and wherein an unreliable transmit power control command includes a transmit power control command that is not inconsistent with a corresponding transmit power control decision made by the receiver.

18. The method in claim 13, further comprising:
identifying a diversity handover communication between a mobile terminal and first and second diversity base stations;
wherein unreliable transmit power control commands include issued transmit power commands from one of the diversity base stations ignored by the mobile terminal.

19. The method in claim 13, further comprising:
regulating a traffic condition of the cell if the congestion condition is signaled.

20. The method in claim 13, further comprising:
performing congestion control in the cell if the congestion condition is signaled.

21. In a mobile radio communications system supporting communications over a radio interface between a radio network and mobile terminals, a method comprising:
identifying transmit power commands that are determined to be reliable without having to measure whether the commands contain errors, wherein the commands are sent from a base station in a cell in the radio network to mobile terminals;
detecting a first number of reliable transmit power increase commands from the radio network to mobile terminals in the cell in a time period;
detecting a second number of reliable transmit power commands from the radio network to mobile terminals in the cell in the time period;
determining a third number associated with the first and second numbers for the time period;
comparing the third number to a first threshold; and
if the third number exceeds the first threshold, signaling a congestion condition in the cell,
wherein the first number is detected by counting reliable transmit power increase commands and the second number is detected by counting reliable transmit power decrease commands.

22. In a mobile radio communications system supporting communications over a radio interface between a radio network and mobile terminals, a method comprising:
identifying transmit power commands sent from a base station in a cell in the radio network to mobile terminals that are determined to be reliable;
detecting a first number of reliable transmit power increase commands from the radio network to mobile terminals in a cell in a time period;
detecting a second number of reliable transmit power commands from the radio network to mobile terminals in a cell in the time period;
determining a third number associated with the first and second numbers for the time period;
comparing the third number to a first threshold; and
if the third number exceeds the first threshold, signaling an undesirable condition in the cell, the method further comprising:

identifying a diversity handover communication between a mobile terminal and first and second diversity base stations, one of the diversity base stations being selected for each of multiple time periods during the diversity handover communication;

determining a frequency at which the first diversity base station is selected; and if the frequency meets a threshold, treating transmit power control commands issued by the first diversity base station to the mobile terminal as reliable.

23. The method in claim 22, wherein the one diversity base station is selected by a mobile station using a site selection diversity transmission (SSDT) indicator.

24. In a mobile radio communications system supporting communications over a radio interface between a radio network and mobile terminals, apparatus comprising:

electronic circuitry configured to determine a reliability of the transmit power commands issued from the radio network to mobile terminals in a cell in a predetermined time period without having to measure whether an error is present in the transmit power commands;

a counter configured to count a first number of reliable transmit power increase commands from the radio network to mobile terminals in a cell in the time period and a second number of reliable transmit power commands from the radio network to mobile terminals in the cell in the time period;

a first comparator configured to compare a third number associated with the first and second numbers for the time period with a first threshold; and a controller configured to detect a load condition in the cell if the third number exceeds the first thresholds, wherein the second number is a number of reliable decrease transmit power commands in the time period, and the third number is a difference between the first number and the second number, and wherein the counter is configured to be incremented with each reliable increase transmit power command and decremented for each reliable decrease transmit power command.

25. The apparatus in claim 24, wherein the second number is a total number of reliable transmit power commands in the time period, and the third number is a percentage of the first number to the second number.

26. The apparatus in claim 24, further comprising:

an averager configured to determine an average of the third number over a predetermined time frame, wherein the first comparator is configured to compare the third number to the first threshold.

27. The apparatus in claim 24, where the apparatus is implemented in a radio network controller coupled to one or more base stations.

28. The apparatus in claim 24, where the apparatus is implemented in a base station.

29. The apparatus in claim 24, further comprising:

a sensor configured to measure a signal level in the cell, and a second comparator configured to compare the measured signal level in the cell to a signal level threshold, wherein if the measured signal level in the cell exceeds the signal level threshold and if the third number exceeds the first threshold, the controller is configured to detect the load condition in the cell.

30. The apparatus in claim 24, wherein the load condition is an overload condition.

31. The apparatus in claim 24, wherein the load condition is an excessive interference or power level in the cell.

32. The apparatus in claim 24, wherein the controller regulates a traffic condition of the cell if the load condition is detected.

33. In a mobile radio communications system supporting communications over a radio interface between a radio network and mobile terminals, apparatus comprising:

electronic circuitry configured to determine a reliability of the transmit power commands issued from the radio network to mobile terminals in a cell in a predetermined time period without having to measure whether an error is present in the transmit power commands;

a counter configured to count a first number of reliable transmit power increase commands from the radio network to mobile terminals in a cell in the time period and a second number of reliable transmit power commands from the radio network to mobile terminals in the cell in the time period;

a first comparator configured to compare a third number associated with the first and second numbers for the time period with a first threshold; and a controller configured to detect a load condition in the cell if the third number exceeds the first threshold, wherein the first number is detected by counting transmit power increase commands actually implemented by mobile terminals in the cell during the time period, and the second number is detected by counting transmit power decrease commands actually implemented by mobile terminals in the cell during the time period.

34. In a mobile radio communications system supporting communications over a radio interface between a radio network and mobile terminals, apparatus comprising:

electronic circuitry configured to determine a reliability of the transmit power commands issued from the radio network to mobile terminals in a cell in a predetermined time period;

a counter configured to count a first number of reliable transmit power increase commands from the radio network to mobile terminals in a cell in the time period and a second number of reliable transmit power commands from the radio network to mobile terminals in the cell in the time period;

a first comparator configured to compare a third number associated with the first and second numbers for the time period with a first threshold; and a controller configured to detect an undesirable condition in the cell if the third number exceeds the first threshold, wherein the electronic circuitry is configured to operate when a diversity handover communication between a mobile station and first and second diversity base stations is established, one of the diversity base stations being selected for each of multiple time periods during the diversity handover communication, and wherein unreliable transmit power control commands include issued transmit power commands from one of the diversity base stations ignored by the mobile station, and wherein the electronic circuitry is configured to determine a frequency at which the first diversity base station is selected, and if the frequency meets a threshold, treating transmit power control commands issued by the first diversity base station to the mobile terminal as reliable.

35. The apparatus in claim 34, wherein the one diversity base station is selected by a mobile station using a site selection diversity transmission (SSDT) indicator.

36. The apparatus in claim 35, the electronic circuitry includes:

a base station selection comparator for generating an output when an SSDT base station identifier matches with an identifier of the one diversity base station;

a threshold detector for generating an enabling signal when the base station selection comparator output exceeds a threshold; and a logic detector for passing transmit power control commands to the counter when the enabling signal is received.

37. The apparatus in claim 36, the electronic circuitry includes:

an averager for averaging the base station selection comparator output and providing an averaged base station selection comparator output to the threshold detector.

38. The apparatus in claim 34, wherein the electronic circuitry includes:

means for determining the reliability of the observed transmit power control commands based on transmit power control commands actually implemented in the cell.

39. The apparatus in claim 34, wherein the electronic circuitry includes:

means for determining the reliability of the observed transmit power control commands based on a power level in the cell.

* * * * *